US009802362B2

(12) United States Patent
Okamoto

(10) Patent No.: US 9,802,362 B2
(45) Date of Patent: Oct. 31, 2017

(54) THREE-DIMENSIONAL FORMATION APPARATUS, THREE-DIMENSIONAL FORMATION METHOD, AND COMPUTER PROGRAM

(71) Applicant: SEIKO EPSON CORPORATION, Tokyo (JP)

(72) Inventor: Eiji Okamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 351 days.

(21) Appl. No.: 14/665,021

(22) Filed: Mar. 23, 2015

(65) Prior Publication Data
US 2015/0273763 A1  Oct. 1, 2015

(30) Foreign Application Priority Data

Mar. 27, 2014 (JP) .................................. 2014-065415
Dec. 10, 2014 (JP) .................................. 2014-249659

(51) Int. Cl.
B29C 67/00 (2017.01)
B33Y 10/00 (2015.01)
(Continued)

(52) U.S. Cl.
CPC ...... B29C 67/0081 (2013.01); B29C 67/0051 (2013.01); B29C 67/0059 (2013.01);
(Continued)

(58) Field of Classification Search
CPC ............ B29C 67/0051; B29C 67/0059; B29C 67/0066; B29C 67/0081; B29C 67/0088;
(Continued)

(56) References Cited

U.S. PATENT DOCUMENTS 5,204,055 A   4/1993  Sachs et al.
6,007,318 A  12/1999  Russell et al.
(Continued)

FOREIGN PATENT DOCUMENTS

JP      06-218712 A    8/1994
JP    2000-280354 A   10/2000
(Continued)

Primary Examiner — Matthew Daniels
Assistant Examiner — Lawrence D Hohenbrink, Jr.
(74) Attorney, Agent, or Firm — Global IP Counselors, LLP

(57) ABSTRACT

A three-dimensional formation apparatus includes a head-unit which can discharge liquid in a first-direction and a control-unit which controls the head-unit. The control-unit forms a hollow on a changed portion where an outline of a cross section object is simultaneously changed in a second-direction and a third-direction towards the inside from the outline of the cross section object in the second-direction or the third-direction, in a first cross section object formation process and executes a filling process of discharging the liquid containing a second quantity which is larger than a first quantity to the hollow so as to come in contact with the cross section object formed in the first cross section object formation process, to fill at least a part of the hollow with the liquid, after the first cross section object formation process is executed and before the second cross section object formation process is executed.

7 Claims, 12 Drawing Sheets

(51) Int. Cl.
  *B33Y 30/00* (2015.01)
  *B33Y 50/00* (2015.01)
  *B33Y 40/00* (2015.01)
  *B33Y 50/02* (2015.01)

(52) U.S. Cl.
  CPC ...... *B29C 67/0066* (2013.01); *B29C 67/0088* (2013.01); *B33Y 10/00* (2014.12); *B33Y 30/00* (2014.12); *B33Y 40/00* (2014.12); *B33Y 50/00* (2014.12); *B33Y 50/02* (2014.12)

(58) Field of Classification Search
  CPC ......... B33Y 10/00; B33Y 30/00; B33Y 40/00; B33Y 50/00; B33Y 50/02
  USPC ......... 425/375; 264/109, 112, 113, 128, 308
  See application file for complete search history.

(56) References Cited

U.S. PATENT DOCUMENTS

| | | |
|---|---|---|
| 6,612,824 B2 | 9/2003 | Tochimoto et al. |
| 7,497,977 B2* | 3/2009 | Nielsen ............... B29C 67/0059 264/113 |
| 2007/0007698 A1 | 1/2007 | Sano |
| 2015/0093544 A1* | 4/2015 | Van De Vrie ....... B29C 67/0059 428/156 |

FOREIGN PATENT DOCUMENTS

| | | |
|---|---|---|
| JP | 2005-067138 A | 3/2005 |
| JP | 2010-058519 A | 3/2010 |

\* cited by examiner

GRADATION VALUE = MAXIMUM GRADATION VALUE (100%) ×
POLYGON VOLUME RATIO
(POLYGON VOLUME RATIO = VL/VX)

NON-SMOOTHING (REFERENCE)

AFTER SMOOTHING PROCESS

MAIN DATA GENERATION

AUXILIARY DATA GENERATION

CROSS SECTION OBJECT FORMATION PROCESS USING MAIN DATA

FILLING PROCESS USING AUXILIARY DATA

FIRST LAYER COMPLETION

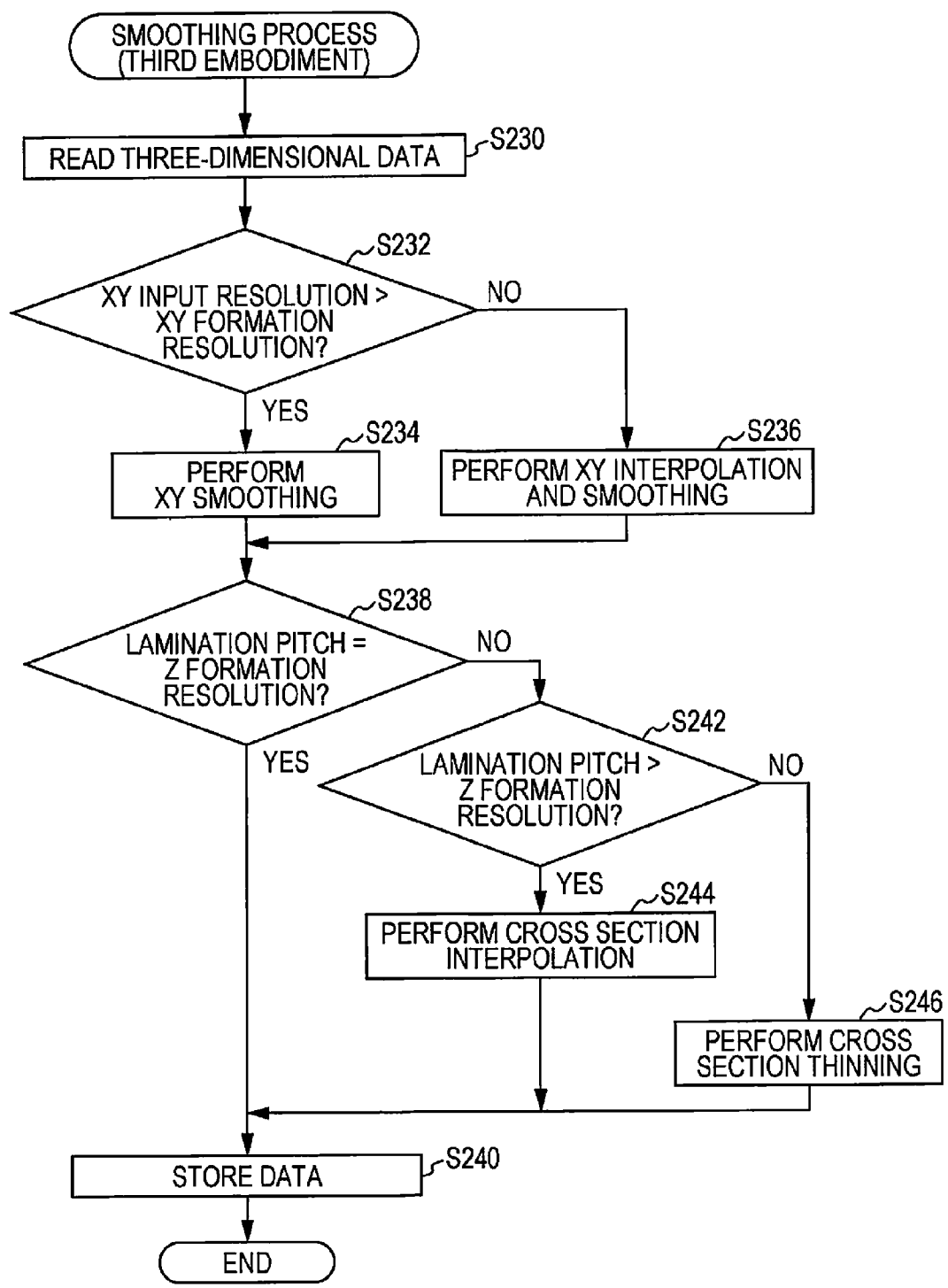

THREE-DIMENSIONAL FORMATION APPARATUS, THREE-DIMENSIONAL FORMATION METHOD, AND COMPUTER PROGRAM

BACKGROUND

1. Technical Field

The present invention relates to a three-dimensional formation apparatus.

2. Related Art

In recent years, a three-dimensional formation apparatus using a printing technology has been paid attention. For example, an ink jet technology generally used in a printing technology is used in three-dimensional formation apparatuses disclosed in JP-A-06-218712, JP-A-2005-67138, and JP-A-2010-58519. In the three-dimensional formation apparatuses using an ink jet technology, a three-dimensional object is formed by performing a step of discharging liquid having curing properties and forming a cross section object for a layer along a horizontal direction (XY direction), over a plurality of layers in a height direction (Z direction).

In a predetermined formation resolution, the ink jet-type three-dimensional formation apparatus discharges liquid to predetermined coordinates and forms dots to form a cross section object. Accordingly, an outline parallel to an X or Y direction can be smoothly formed, but a deviation of coordinates between adjacent dots is generated regarding an outline inclined in the above directions, and jaggy is generated. Particularly, jaggy is easily noticed in a case where an angle inclined in the X or Y direction is an acute angle.

In a printing technology of a two-dimensional image, it is possible to prevent generation of jaggy by forming small dots, for example, in a portion where the deviation of coordinates is generated. However, when small dots are formed in a portion where the deviation of coordinates is generated in a case of forming a three-dimensional object, a height of the portion is decreased, and it is difficult to form an appropriate three-dimensional shape. Accordingly, it is difficult to simply apply the printing technology of a two-dimensional image to the formation process of a three-dimensional object. Thus, in the three-dimensional formation apparatus which discharges liquid and forms a three-dimensional object, it is necessary to obtain a technology which can effectively prevent generation of jaggy in an object to be formed.

SUMMARY

The invention is realized in the following forms.

(1) According to an aspect of the invention, there is provided a three-dimensional formation apparatus which forms a three-dimensional object, the apparatus including: a head unit which discharges liquid which is one material of the object in a first direction, among the first direction, a second direction, and a third direction orthogonal to each other; and a control unit which forms the object by laminating the plurality of cross section objects by executing a cross section object formation process of forming a cross section object for one layer of the object several times by discharging the liquid containing a quantity equal to or smaller than a first quantity to a designated coordinate among coordinates representing a position in the second direction and a position in the third direction, by controlling the head unit, in which the control unit forms a hollow on a changed portion where an outline of the cross section object is simultaneously changed in the second direction and the third direction towards the inside from the outline of the cross section object in the second direction or the third direction, in the first cross section object formation process among the cross section object formation processes executed several times, and executes a filling process of discharging the liquid containing a second quantity which is larger than the first quantity to the hollow so as to come in contact with the cross section object formed in the first cross section object formation process, to fill at least a part of the hollow with the liquid, after the first cross section object formation process is executed and before the second cross section object formation process is executed. In this case, since the hollow is formed in the portion where the outline of the cross section object is simultaneously changed in the second direction and the third direction, and then the hollow is filled by discharging the liquid containing the quantity (second quantity) which is larger than the normal quantity (first quantity) to the hollow, it is possible to effectively prevent generation of jaggy on the outline inclined in the second direction or the third direction.

(2) The three-dimensional formation apparatus according to the aspect of the invention may further include a curing energy application unit which applies curing energy for curing the liquid, and the curing energy application unit may apply the curing energy to the discharged liquid, after the liquid is discharged in the first cross section object formation process and before the filling process is executed at an interval of a first time period, and may apply the curing energy to the discharged liquid, after the liquid is discharged in the filling process and before the second cross section object formation process is executed at an interval of a second time period which is longer than the first time period. In this case, since the curing energy is applied at the interval of the first time period after the liquid is discharged in the cross section object formation process, it is possible to prevent distortion of the shape of the hollow. Accordingly, in the subsequent filling process, it is possible to accurately discharge the curable liquid to the hollow. In addition, since the curing energy is applied at the interval of the second time period which is longer than the first time period, after filling the hollow with the liquid, it is possible to sufficiently apply time only for filling the hollow with the liquid. Therefore, it is possible to more effectively prevent the generation of jaggy on the outline.

(3) In the three-dimensional formation apparatus according to the aspect of the invention, the coordinate to which the liquid is discharged in the cross section object formation process may have the element corresponding to each coordinate and may be designated by two-dimensional raster data in which a gradation value corresponds to each element, and the changed portion may be a portion including a first element in which the gradation value is less than 100% and a second element which comes in contact with the inside of the first element on the second direction side or the third direction side, when a portion corresponding to the outline of the cross section object of the raster data is subjected to a smoothing process. In this case, since the hollow is formed on the portion where the gradation value is less than 100% when the smoothing process of the raster data representing the cross section object is performed, it is possible to form the hollow in a position effective for preventing the generation of jaggy.

(4) In the three-dimensional formation apparatus according to the aspect of the invention, the second quantity may be a quantity corresponding to a value obtained by adding the gradation value of the first element and the gradation value of the second element. In this case, since it is possible to acquire the quantity of the liquid to be discharged to the hollow according to the gradation value of the element present in the portion in which the hollow is formed, it is possible to accurately acquire the quantity of the liquid for filling the hollow.

(5) In the three-dimensional formation apparatus according to the aspect of the invention, the shape of the object may be represented with polygon data which is an assembly of a plurality of polygons, and the first element may be an element corresponding to a position where the polygon crosses. In this case, since the first element in which the gradation value is less than 100% in the smoothing process is determined based on whether or not the polygon representing the three-dimensional object crosses the element, it is possible to accurately specify the first element.

(6) In the three-dimensional formation apparatus according to the aspect of the invention, the gradation value of the first element may be a value corresponding to a ratio of a volume remaining when a volume is cut by the polygon, to the volume of the first element occupying a three-dimensional space. In this case, it is possible to accurately calculate the gradation value of the first element in which the gradation value is less than 100% in the smoothing process.

(7) In the three-dimensional formation apparatus according to the aspect of the invention, the second element may be an element adjacent to a direction of a large component among a component in the second direction and a component in the third direction of an inward normal line of the polygon which crosses the first element, among an element in the second direction adjacent to the first element and an element in the third direction adjacent to the first element. In this case, it is possible to accurately specify the formation direction of the hollow which can prevent the generation of jaggy.

The invention can be realized in various forms, in addition to the aspects of the three-dimensional formation apparatus. For example, invention can be realized in forms of a three-dimensional formation method of forming a three-dimensional object by a three-dimensional formation apparatus, a computer program causing a computer to control a three-dimensional formation apparatus and form a three-dimensional object, and a non-primary recording medium in which the computer program is recorded.

BRIEF DESCRIPTION OF THE DRAWINGS

The invention will be described with reference to the accompanying drawings, wherein like numbers reference like elements.

FIG. 10 is a flowchart showing a smoothing process of a third embodiment.

DESCRIPTION OF EXEMPLARY EMBODIMENTS

A. First Embodiment

Figure 1:
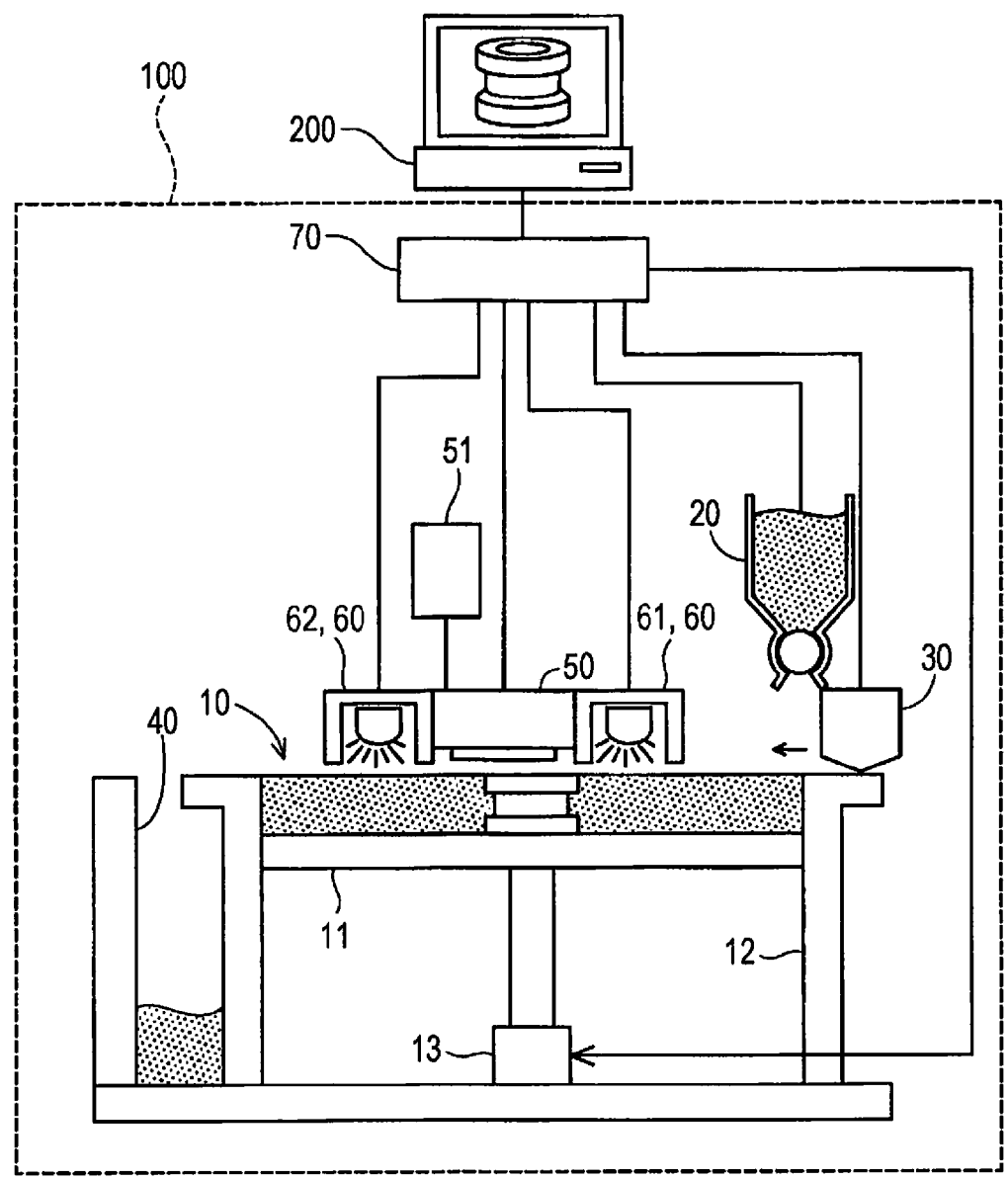
FIG. 1 is an explanatory diagram showing a schematic configuration of a three-dimensional formation apparatus.

FIG. 1 is an explanatory diagram showing a schematic configuration of a three-dimensional formation apparatus as a first embodiment. A three-dimensional formation apparatus 100 includes a formation unit 10, a powder supply unit 20, a flattening mechanism 30, a powder collection unit 40, a head unit 50, curing energy application units 60, and a control unit 70. A computer 200 is connected to the control unit 70. The three-dimensional formation apparatus 100 and the computer 200 can be collectively treated as a three-dimensional formation apparatus in a broad sense. FIG. 1 shows an X direction, a Y direction, and a Z direction orthogonal to each other. The Z direction is a direction along a vertical direction and the X direction is a direction along a horizontal direction. The Y direction is a direction vertical to the Z direction and the X direction. The Z direction corresponds to a first direction, the X direction corresponds to a second direction, and the Y direction corresponds to a third direction.

The formation unit 10 is a tank-shaped structure in which a three-dimensional object is formed. The formation unit 10 includes a formation stage 11 which is flat in the XY direction, a frame body 12 which surrounds around the formation stage 11 and stands in the Z direction, and an actuator 13 which moves the formation stage 11 along the Z direction. The formation stage 11 moves in the Z direction in the frame body 12 by the control unit 70 controlling an operation of the actuator 13.

The powder supply unit 20 is an apparatus which supplies powder into the formation unit 10. The powder supply unit 20 is, for example, configured with a hopper or a dispenser.

The flattening mechanism 30 is a mechanism for flattening powder supplied into the formation unit 10 or onto the frame body 12 by moving an upper surface of the formation unit 10 in the horizontal direction (XY direction), and forming a powder layer on the formation stage 11. The flattening mechanism 30 is, for example, configured with a squeegee or a roller. The powder extruded from the formation unit 10 by the flattening mechanism 30 is discharged into the powder collection unit 40 provided adjacent to the formation unit 10.

The three-dimensional formation apparatus 100 of the first embodiment uses liquid having curing properties (hereinafter, referred to as curable liquid) and the powder as the materials of the three-dimensional object. As the curable liquid, a mixture of a resin material of liquid having a monomer and an oligomer bound with the monomer as main components, and a polymerization initiator which turns into an excitation state and starts polymerization by promoting the monomer and the oligomer, when an ultraviolet light beam is emitted, is used. For the monomer in the curable liquid, a monomer having comparatively low molecular weight is selected so that a viscosity of the curable liquid is set as a low viscosity to be discharged dropwise from the head unit 50, and the number of monomers contained in one oligomer is also approximately adjusted to several molecules. The curable liquid has properties to be rapidly cured to be solid by polymerizing the monomers with each other to grow the monomers to the oligomer or polymerizing some oligomers with each other, when the curable liquid is irradiated with the ultraviolet light beam and the polymerization initiator turns into an excitation state. In the embodiment, powder in which a polymerization initiator which is different from the polymerization initiator contained in the curable liquid is attached to the surface thereof is used as the powder. The polymerization initiator attached to the surface of the powder has properties of starting polymerization of the monomers or the oligomer by promoting it, when the polymerization initiator comes in contact with the curable liquid. Accordingly, when the curable liquid is supplied to the powder in the formation unit 10, the curable liquid permeates the inside of the powder and comes in contact with the polymerization initiator on the surface of the powder to be cured. As a result, in a portion to which the curable liquid is discharged, the powders are bound by the cured curable liquid. When the powder having the polymerization initiator attached to the surface thereof is used as the powder, it is also possible to use curable liquid not containing the polymerization initiator.

The head unit 50 is an apparatus which receives the supply of the curable liquid from a tank 51 connected to the head unit 50 and discharges the curable liquid to a powder layer in the formation unit 10 along the Z direction. The head unit 50 can be moved in the X direction and the Y direction with respect to the three-dimensional object formed in the formation unit 10. The head unit 50 can be moved in the Z direction relatively to the three-dimensional object by the formation stage 11 in the formation unit 10 which moves in the Z direction. The head unit 50 of the embodiment is a so-called piezoelectric driving type liquid droplet discharge head. By filling a pressure chamber provided with fine nozzle holes with the curable liquid and bending a side wall of the pressure chamber using a piezoelectric element, the piezoelectric driving type liquid droplet discharge head can discharge a volume of the curable liquid corresponding to a decreased amount of a volume of the pressure chamber as liquid droplets. Since the control unit 70 which will be described later controls a voltage waveform applied to the piezoelectric element, it is possible to adjust quantity of the curable liquid per droplet discharged from the head unit 50 in a stepwise manner. Nozzle holes through which the curable liquid is discharged, are arranged on the head unit 50 along the Y direction.

The curing energy application units 60 are apparatuses which apply energy for curing the curable liquid discharged from the head unit 50. In the embodiment, the curing energy application units 60 are configured with a final curing light emitting apparatus 61 and a temporary curing light emitting apparatus 62 which are disposed so as to interpose the head unit 50 in the X direction. When the head unit 50 is moved, the curing energy application units 60 are also moved according to the movement thereof. The ultraviolet light beam is emitted from the final curing light emitting apparatus 61 and the temporary curing light emitting apparatus 62 as curing energy for curing the curing liquid. The temporary curing light emitting apparatus 62 is used in performing temporary curing for fixing the discharged curable liquid to a landed position thereof. The final curing light emitting apparatus 61 is used for completely curing the curable liquid after the temporary curing. The energy of the ultraviolet light beam emitted from the temporary curing light emitting apparatus 62 is energy of 20% to 30% of the ultraviolet light beam emitted from the final curing light emitting apparatus 61, for example. The temporary curing is also referred to as "pinning" and the final curing is also referred to as "curing".

The control unit 70 is an apparatus which controls the actuator 13, the powder supply unit 20, the flattening mechanism 30, the head unit 50, and the curing energy application units 60 and forms the three-dimensional object. The control unit 70 includes a CPU and a memory. The CPU realizes a cross section object formation function and a filling function by loading computer programs stored in a memory or a recording medium in the memory and executing the programs. The cross section object formation function is a function of controlling the head unit 50 and forming a cross section object for one layer of the three-dimensional object by discharging each of the curable liquid containing a first quantity to a designated coordinate among the coordinates in the X direction and the Y direction. In the cross section object formation function, a hollow is formed on a changed portion where the outline of the cross section object is simultaneously changed in the X direction and the Y direction towards the inside from the outline of the cross section object in the second direction or the third direction. The filling function is a function of discharging the curable liquid containing a second quantity which is smaller than the first quantity to the hollow of the cross section object formed by the cross section object formation function and filling at least a part of the hollow with the curable liquid. The specific process content for realizing these functions will be described later. These functions of the control unit 70 may also be applied to the computer 200 side.

A procedure of forming the three-dimensional object by the three-dimensional formation apparatus 100 will be simply described. First, the computer 200 slices three-dimensional data representing a shape of a three-dimensional object according to a formation in the Z direction (for example, 600 dpi) and generates a plurality of cross section data items along the XY direction. The cross section data items has a predetermined formation resolution (for example, 600 dpi×600 dpi) are represented as two-dimensional raster data in which a gradation value is stored with respect to each element. The gradation value stored with respect to each element represents the quantity of the curable liquid discharged to the XY coordinate corresponding to the element. That is, in the embodiment, the coordinate to which the curable liquid and the quantity of the curable liquid to be discharged are designated for the control unit 70 of the three-dimensional formation apparatus 100 by the raster data. For example, when the gradation value is designated as 100% with respect to a certain coordinate, a quantity of the curable liquid which can fill 100% of a volume of an element (voxel) in a three-dimensional space corresponding to the coordinate, is discharged from the head unit 50. Herein, the quantity of the curable liquid per droplet discharged from the head unit 50 is limited to the finite kinds of quantity. Accordingly, when the gradation value is designated by the raster data, the control unit 70 makes the quantity of the curable liquid corresponding to the designated gradation value to the closest quantity among the predetermined kinds of quantity. For example, when the quantities of the curable liquid which can be discharged from the head unit 50 are nine types of 0%, 25%, 50%, 75%, 100%, 125%, 150%, 175%, and 200%, the control unit 70 selects the quantity closest to the designated gradation value among the nine types of quantity of the curable liquid. When the gradation value is designated, the control unit 70 may multiply a predetermined coefficient by the designated gradation value according to a curing shrinkage ratio of the curable liquid, for example.

When the cross section data is acquired from the computer 200, the control unit 70 of the three-dimensional formation apparatus 100 controls the powder supply unit 20 and the flattening mechanism 30 and forms the powder layer in the formation unit 10. The control unit drives the head unit 50 and discharges the curable liquid to the powder layer according to the cross section data, and then controls the curing energy application units 60 and emits the ultraviolet light beam towards the discharged curable liquid. By doing so, the curable liquid is cured and powders are bound with each other by the ultraviolet light beam, and the cross section object corresponding to the cross section data for one layer is formed in the formation unit 10. When the cross section object for one layer is formed as described above, the control unit 70 drives the actuator 13 and moves the formation stage 11 downwards in the Z direction by an amount of a lamination pitch corresponding to the formation resolution in the Z direction. When the formation stage 11 is moved downwards, the control unit 70 forms a new powder layer on the cross section object which is previously formed on the formation stage 11. When the new powder layer is formed, the control unit 70 receives a next cross section data item from the computer 200, discharges the curable liquid to a new powder layer, and irradiates the new powder layer with the ultraviolet light beam, to form a new cross section object. As described above, when the cross section data of each layer is received from the computer 200, the control unit 70 forms the cross section object for each layer and forms the three-dimensional object by laminating the layer, by controlling the actuator 13 or the powder supply unit 20, the flattening mechanism 30, the head unit 50, and the curing energy application units 60.

Next, the more specific process content of the three-dimensional formation process of the embodiment will be described.

Figure 2:
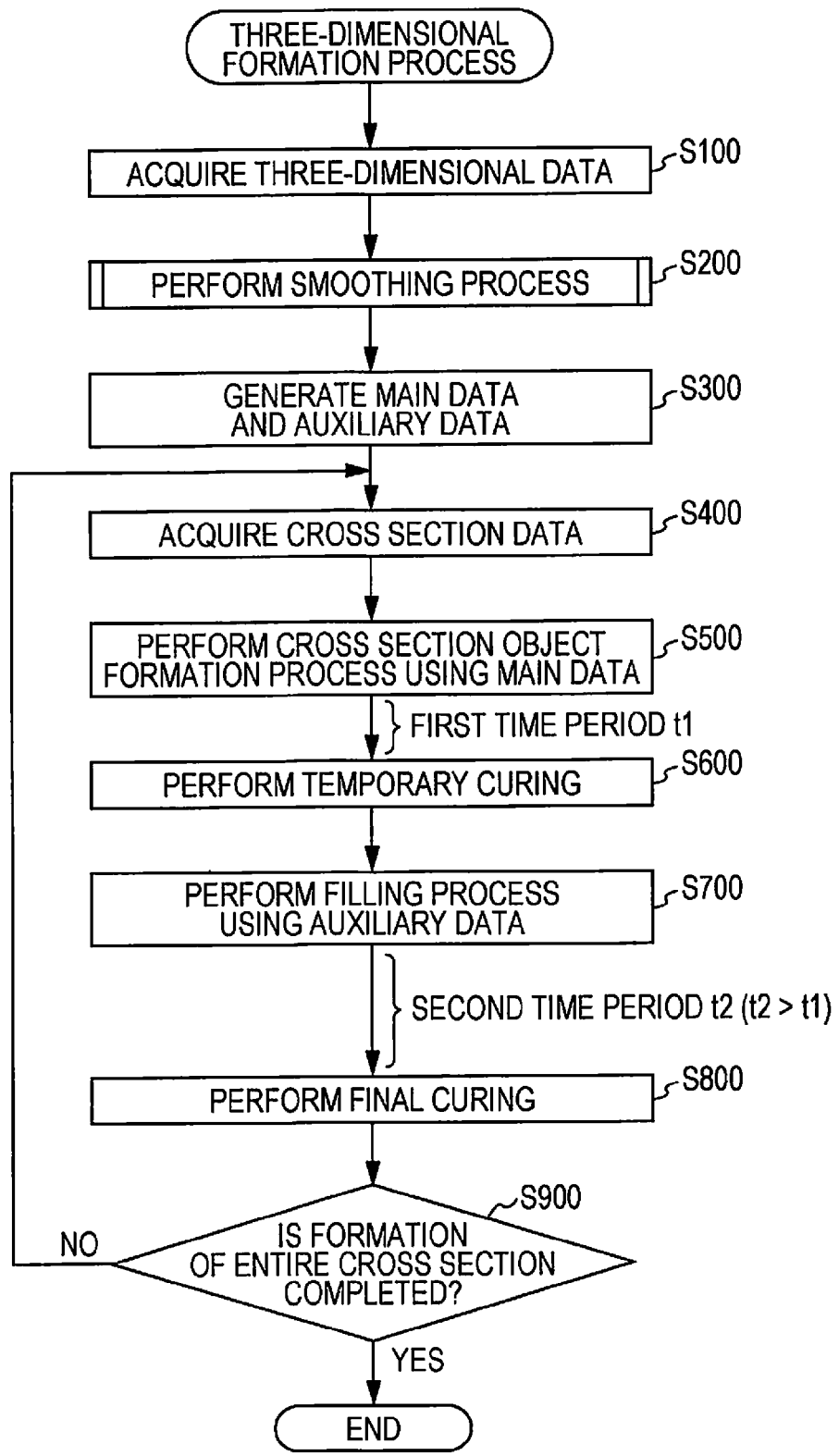
FIG. 2 is a flowchart of a three-dimensional formation process.

FIG. 2 is a flowchart of the three-dimensional formation process executed by the computer 200 and the three-dimensional formation apparatus 100. In the embodiment, first, the computer 200 acquires the three-dimensional data representing the shape of the three-dimensional object from a recording medium or a network, or an application program executed in the computer 200 (Step S100). The three-dimensional data, for example, is represented as three-dimensional polygon data, two-dimensional raster data for each cross section, and two-dimensional vector data for each cross section. In the embodiment, the three-dimensional data is represented as the polygon data. When the three-dimensional data is acquired, the computer 200 performs the smoothing process (Step S200).

Figure 3:
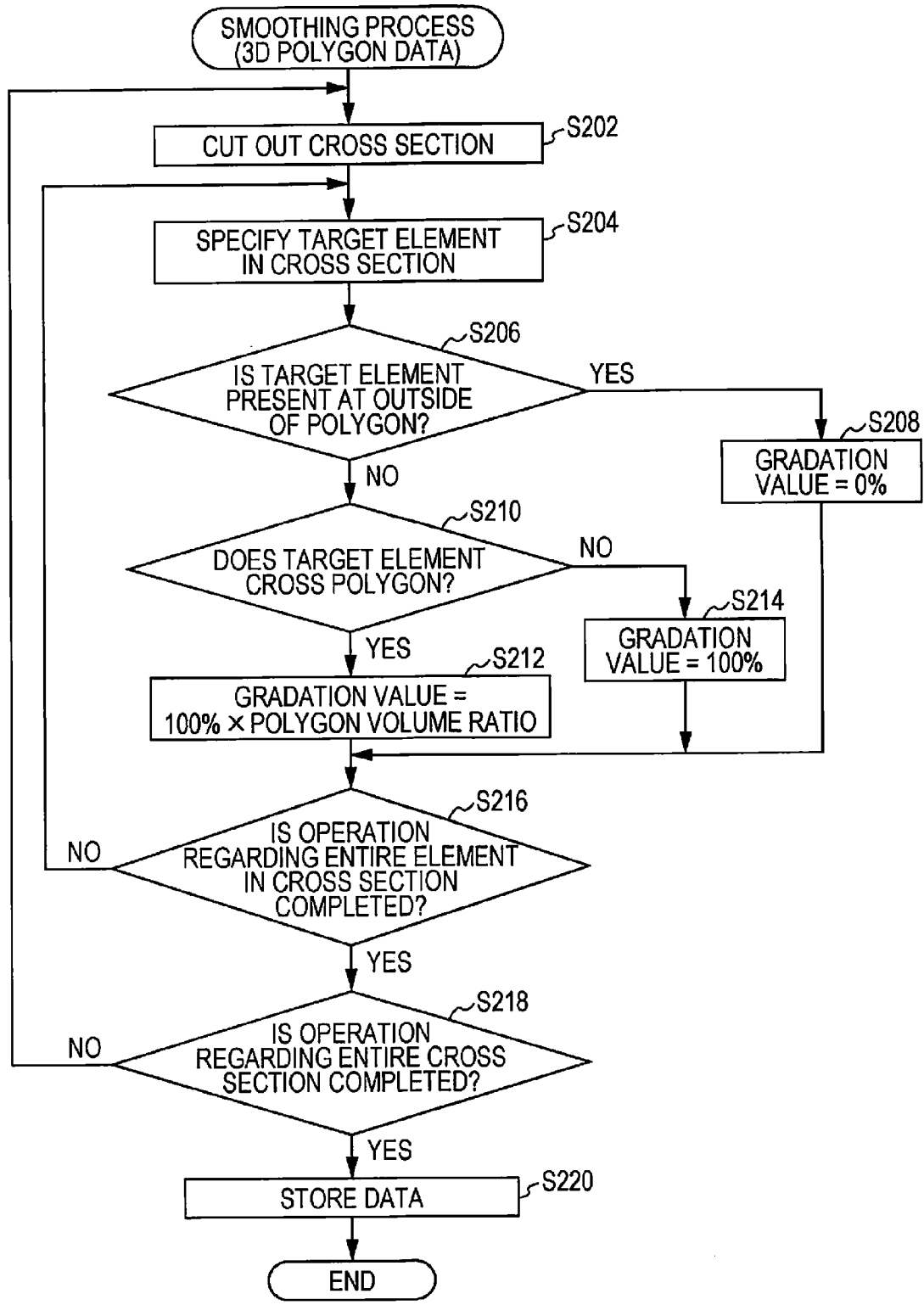
FIG. 3 is a flowchart showing details of a smoothing process.

FIG. 3 is a flowchart showing details of the smoothing process. In the smoothing process, the raster data for each cross section is generated from the three-dimensional data. First, the computer 200 cuts out one cross section having a thickness according to the formation resolution in the Z direction from the three-dimensional polygon data (Step S202). When one cross section is cut out, the computer 200 specifies the element (coordinate) on the raster data for determining the gradation value in the following process (Step S204). Hereinafter, this element is referred to as a "target element".

When the target element is specified, the computer 200 determines whether or not there is a target element on the outside of the polygon (Step S206). When it is determined that there is a target element on the outside of the polygon (Step S206: YES), the computer 200 determines the gradation value of the target element as 0% (Step S208). When it is determined that there is not a target element on the outside of the polygon (Step S206: NO), the computer 200 further determines whether or not the polygon crosses the target element (Step S210).

Figure 4:
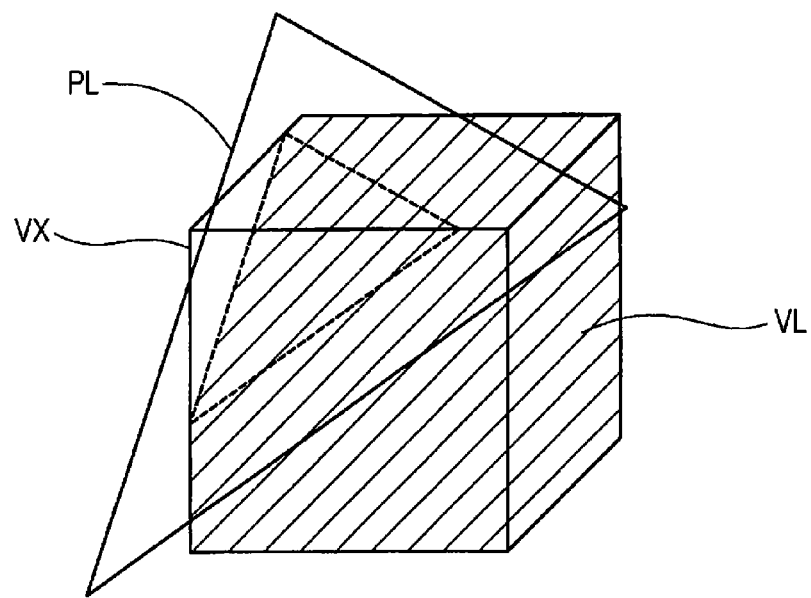
FIG. 4 is an explanatory diagram showing a positional relationship between a target element and a polygon.

FIG. 4 is an explanatory diagram showing a positional relationship between the target element and the polygon. FIG. 4 shows a state where a polygon PL crosses a cubic lattice VX corresponding to the target element. In Step S210 described above, when it is determined that the polygon crosses the target element as shown in FIG. 4 (Step S210: YES), the computer 200 calculates the gradation value of the target element based on the following equation (1) (Step S212).

$$\text{Gradation value} = \text{maximum gradation value}(100\%) \times \text{polygon volume ratio} \quad (1)$$

Herein, the polygon volume ratio is a ratio of a remaining volume VL in a case where a volume of the cubic lattice VX corresponding to the target element is cut out by the polygon, with respect to the volume thereof.

In Step S210 described above, when it is determined that the polygon does not cross the target element (Step S210: NO), the surface represented as the polygon and the surface on the outside of the cubic lattice represented as the target element coincide with each other, and accordingly, the computer 200 determines the gradation value of the target element as 100% (Step S214).

When the gradation value of the target element is determined by the processes described above, the computer 200 determines whether or not the determination of the gradation value is completed regarding the entire element in the current cross section (Step S216). When it is determined that the gradation value regarding the entire element in the current cross section is not determined (Step S216: NO), the process returns to Step S204 and the computer 200 determines the gradation value regarding the other element.

When it is determined that the gradation value regarding the entire element in the current cross section is determined (Step S216: YES), the computer 200 determines whether or not the determination of the gradation value regarding the entire cross section is completed (Step S218). When it is determined that the gradation value regarding the entire cross section is not completed (Step S218: NO), the process returns to Step S202 and the computer 200 cuts out the next cross section and determines the gradation value regarding the entire element in the cross section. When it is determined that the gradation value regarding the entire element is completed (Step S218: YES), the computer 200 accommodates raster data in which the gradation value regarding the determined entire element is accommodated, in a memory or a recording medium, regarding the entire cross section as the cross section data (Step S220), and the smoothing process is completed.

The description returns to FIG. 2. When the smoothing process described above is completed, the computer 200 generates the main data and the auxiliary data based on the raster data accommodated in a memory by the smoothing process (Step S300). The main data is data which is mainly used when the three-dimensional formation apparatus 100 forms the cross section object. The auxiliary data is data for refilling the curable liquid to a part of the cross section object formed using the main data.

Figure 5A:
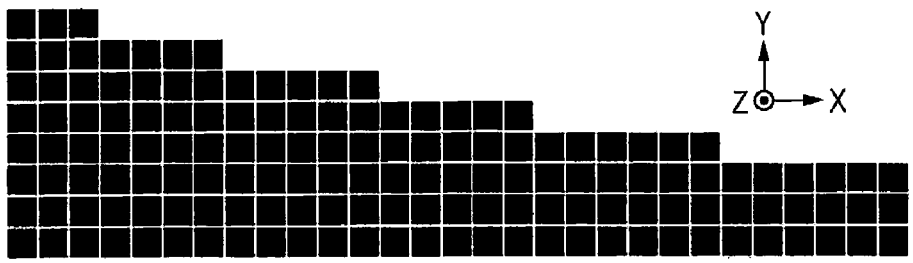
FIGS. 5A to 5D are explanatory diagrams showing a method of forming main data and auxiliary data.
Figure 5B:
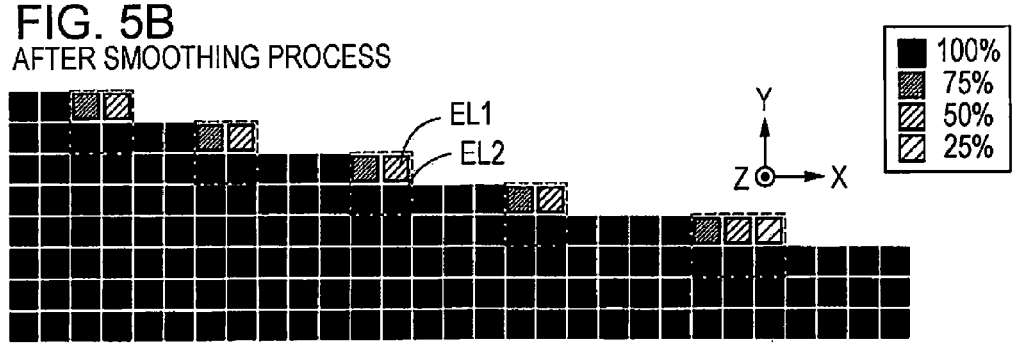

FIGS. 5A to 5D are explanatory diagrams showing a method of generating the main data and the auxiliary data regarding one cross section by the computer 200. FIG. 5A is a reference diagram showing an outline portion of the raster data when the smoothing process described above is performed. When the smoothing process described above is not performed, the gradation value of the raster data is represented as any one of 0% or 100%, and accordingly jaggy having a shape of a difference in level as shown in FIG. 5A is generated on the outline portion represented as the raster data. Particularly, jaggy is easily noticed in a case where an angle inclined in each of the X and Y directions is an acute angle. Meanwhile, when the smoothing process described above is not performed, the gradation value of the difference-in-level portion is represented as a half tone and the outline is smoothly represented, as shown in FIG. 5B. FIGS. 5A to 5D show an example where the gradation values are represented as five types of 0%, 25%, 50%, 75%, and 100%.

Figure 5C:
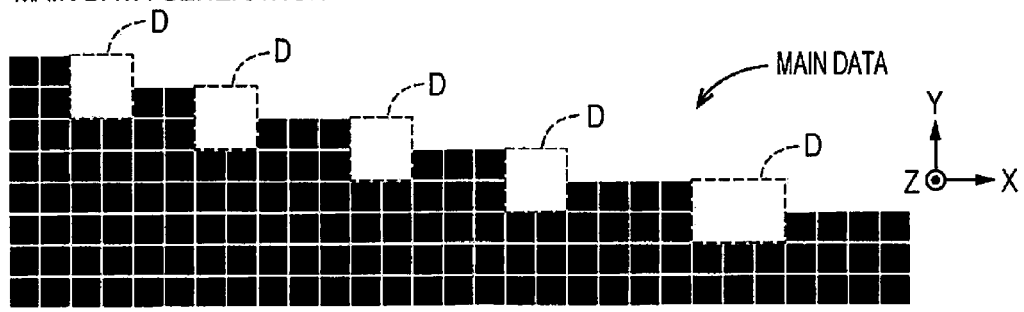

As shown in FIG. 5C, the computer 200 performs the thinning of first elements EL1 in which the gradation value is less than 100%, and second elements EL2 which are adjacent to the first elements EL1 on the X direction side and the inside of the Y direction side, from the smoothed raster data represented as shown in FIG. 5B, and accordingly, generates the main data. In the example shown in FIGS. 5A to 5D, all of the gradation values of the second elements EL2 are 100%. When the thinning of the first elements EL1 and the second elements EL2 is performed, hollows D is formed in the X direction and the Y direction, on the changed portion where the outline of the cross section object is simultaneously changed in the X direction and the Y direction, in the shape represented as the main data. FIGS. 5A to 5D show an example in which the hollows are formed in the Y direction. As described below, the computer 200 determines to set which element adjacent to the X direction side or the Y direction side with respect to the first element EL1 as the second element EL2, that is, to select a direction in which the hollow is formed from the first element EL1.

Figure 6:
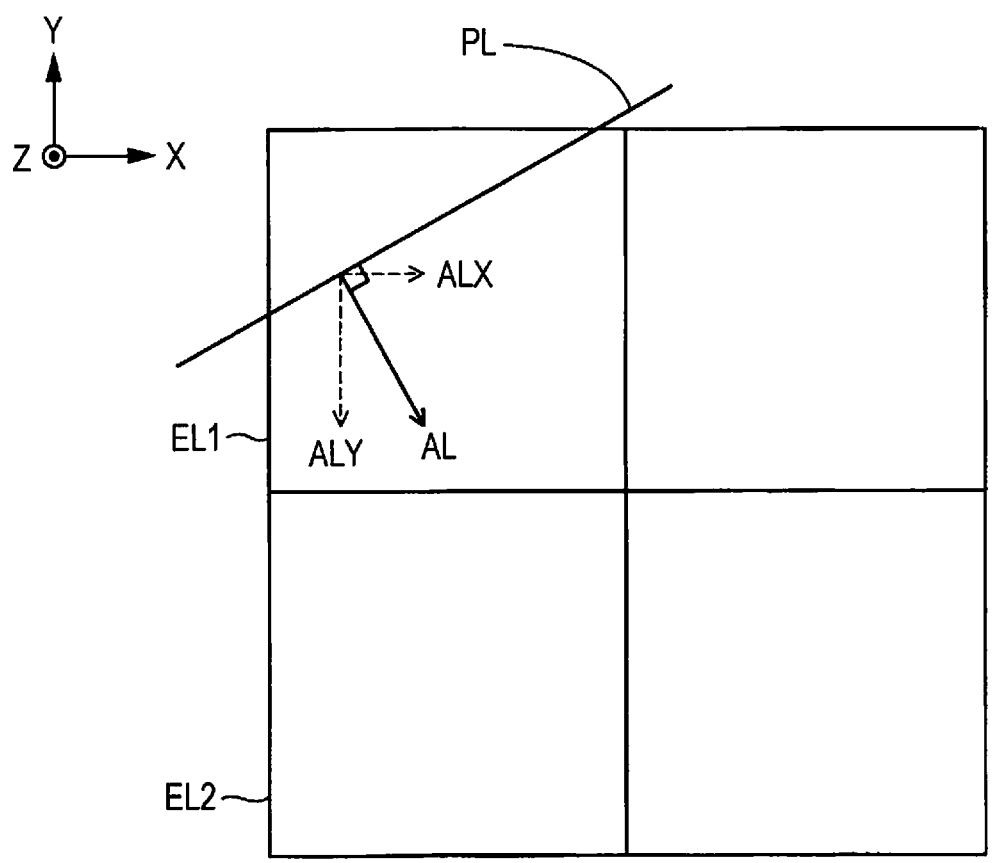
FIG. 6 is a diagram showing a concept of a second element.

FIG. 6 is a diagram showing a concept of a specifying method of the second element EL2. First, the computer 200 acquires an inward normal line AL of the polygon PL which crosses the first element EL1. An X component ALX and a Y component ALY of the normal line thereof are acquired, and the element adjacent to the direction of the component having a large value among the components (Y component ALY in a case of FIG. 6) is specified as the second element EL2. When the position of the second element EL2 is specified as described above, it is possible to appropriately determine the direction in which the hollow is formed, with respect to the inclined outline.

Figure 5D:
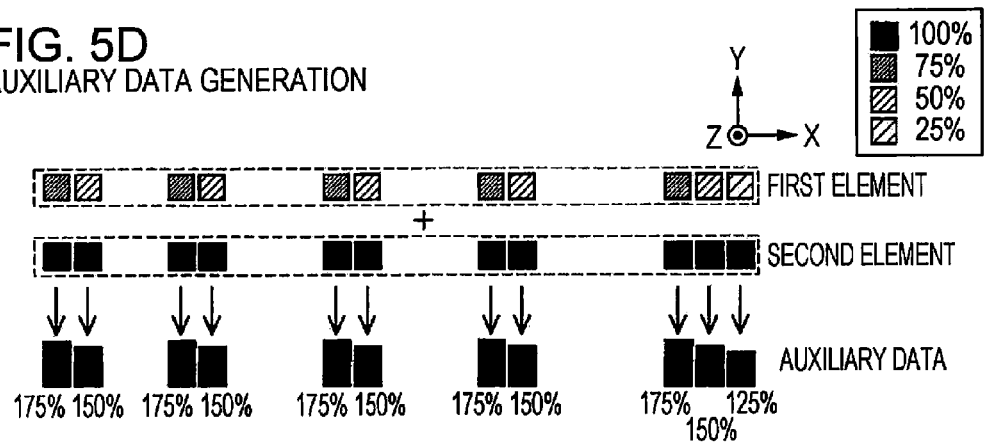

When the main data in which the hollow D is formed, is generated as described above, the computer 200 generates the auxiliary data. Specifically, as shown in FIG. 5D, the auxiliary data is generated by adding the gradation value of the first element removed when generating the main data and the gradation value of the second element adjacent to the first element. The computer 200 generates the main data and the auxiliary data regarding each cross section by executing the process described above regarding the entire cross sections. When the main data and the auxiliary data are generated, the computer 200 accommodates the data items in a memory or a recording medium regarding the entire cross sections as the cross section data items.

After the main data and the auxiliary data are generated regarding the entire cross sections by the computer 200, the control unit 70 of the three-dimensional formation apparatus 100 acquires the cross section data items (the main data and the auxiliary data) representing the cross section of the lowest layer from the computer 200 (Step S400 of FIG. 2). When the cross section data is acquired, the control unit 70 executes a cross section object formation process using the main data among the cross section data items thereof (Step S500). The cross section object formation process is a process of discharging the curable liquid containing the first quantity to each coordinate in the X direction and the Y direction while moving the head unit 50 in the X direction and the Y direction, to form the cross section object which is a part of the three-dimensional object. The first quantity in the embodiment is a quantity corresponding to the 100% of the gradation value and is a quantity of the curable liquid necessary for filling the volume of the element (voxel) corresponding to one coordinate. In the embodiment, all of the dots to be formed by the main data are formed with the curable liquid containing the first quantity, but the dots may be formed by distinguishing the curable liquid containing the first quantity and the curable liquid having less than the first quantity. In the embodiment, the head unit 50 is moved in the Y direction for each time when the discharge of the curable liquid in the X direction is completed, and the cross section object is formed over the entire XY plane.

Figure 7A:
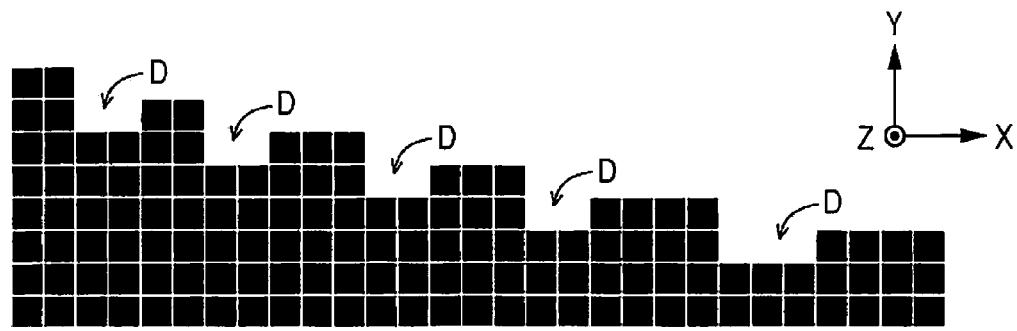
FIGS. 7A to 7C are explanatory diagrams showing a state where a cross section object is formed by a head unit.
Figure 7B:
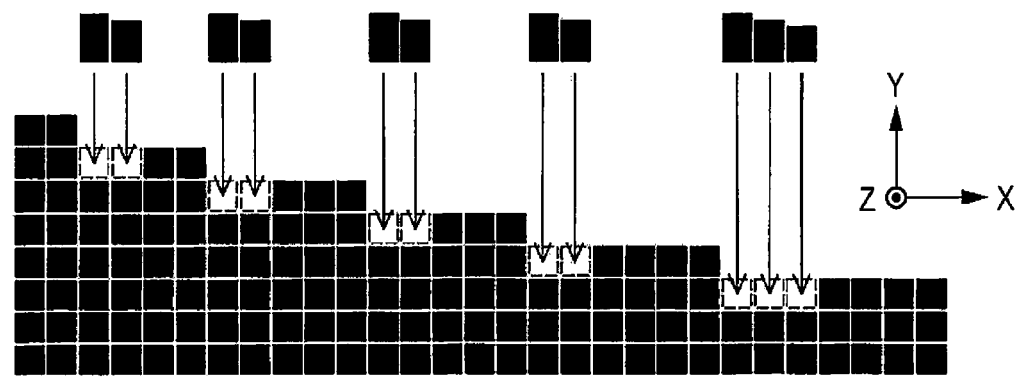
Figure 7C:
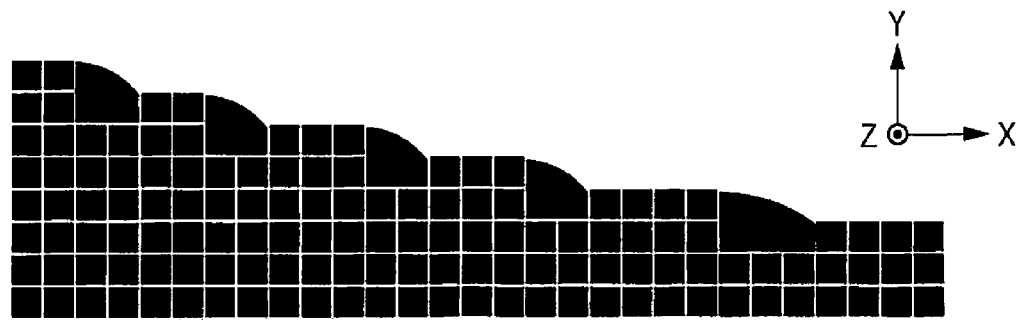

FIGS. 7A to 7C are explanatory diagrams showing a state where the cross section object is formed by the head unit 50. According to the cross section object formation process performed in Step S500, the cross section object is formed based on the main data shown in FIG. 5C. Accordingly, as shown in FIG. 7A, the hollow D is formed on the changed portion where the outline of the cross section object is simultaneously changed in the X direction and the Y direction towards the inside from the outline of the cross section object in the X direction or the Y direction. As shown in FIG. 7A, in the embodiment, the hollow D is formed on the corner of the inside of the difference-in-level portion of the outline. In FIGS. 7A to 7C, for easy understanding, each dot is shown as the lattice, but all of the dots adjacent to each other are continuously connected to each other, in practice.

When the cross section object is formed based on the main data, the control unit 70 controls the curing energy application units 60 and performs the temporary curing of the discharged curable liquid (Step S600 of FIG. 2). By performing the temporary curing, it is possible to fix the shape of the hollow D. Herein, a time period from the timing when the curable liquid is discharged from the head unit 50 to the timing when the curing energy for the temporary curing is applied to the curable liquid, is referred to as a "first time period t1".

After performing the temporary curing in Step S600 described above, the control unit 70 continuously performs a filing process using the auxiliary data (Step S700). As shown in FIG. 7B, the filling process is a process of discharging the curable liquid containing the second quantity corresponding to the gradation value represented as the auxiliary data to the hollow D of the cross section object, so as to come in contact with the cross section object formed by the cross section object formation process, to fill at least a part of the hollow D with the curable liquid. As described above, the auxiliary data is generated by adding the gradation value of the first element and the gradation value of the second element. In the embodiment, the gradation value of the second element is 100% and the gradation value of the first element is larger than 0% and smaller than 100%. Accordingly, the second quantity represented as the auxiliary data is larger than the first quantity (100%). For convenience of illustration, FIG. 7B shows the curable liquid containing the second quantity to be ejected to the cross section object in the positive Y direction, but the curable liquid is ejected so as to come in contact with the inner wall of the hollow D in the positive Z direction in practice.

As described above, when the filling process using the auxiliary data is performed, the control unit 70 does not perform the temporary curing, but controls curing energy application units 60 and performs the final curing for the cross section object, at an interval of a second time period t2 which is longer than the first time period t1 (Step S800 of FIG. 2). By performing the processes from Step S400 to Step S800 described above, the cross section object is formed for one layer.

FIG. 7C shows a state where the cross section is formed for one layer. In step s800 described above, the temporary curing is not performed to the curable liquid discharged into the hollow D in the filing process. Accordingly, the curable liquid containing the second quantity discharged into the hollow D is not immediately cured, approaches the entire hollow D by surface tension and a capillary phenomenon, and smoothly fills the difference in level generated on the outline of the cross section object. By performing the final curing after the second time period t2 longer than the first period time t1 described above is elapsed, the cross section object formed by the main data and the curable liquid formed by the auxiliary data are completely cured, and one cross section object is completed.

As described above, when the cross section object for one layer is formed, the control unit 70 determines whether or not the entire cross section object is formed (Step S900 of FIG. 2). When it is determined that the entire cross section object is not formed (Step S900: NO), the process returns to Step S400 and the control unit 70 reads the next cross section data and forms the cross section object for the next layer. Before forming the cross section object for the next layer, the control unit 70 moves the formation stage 11 downwards and forms the powder layer. In Step S900 described above, when it is determined that the entire cross section object is formed (Step S900: YES), the control unit 70 finishes the three-dimensional formation process. The three-dimensional object is formed in the formation unit 10 by performing a series of the three-dimensional formation process described above.

Figure 8:
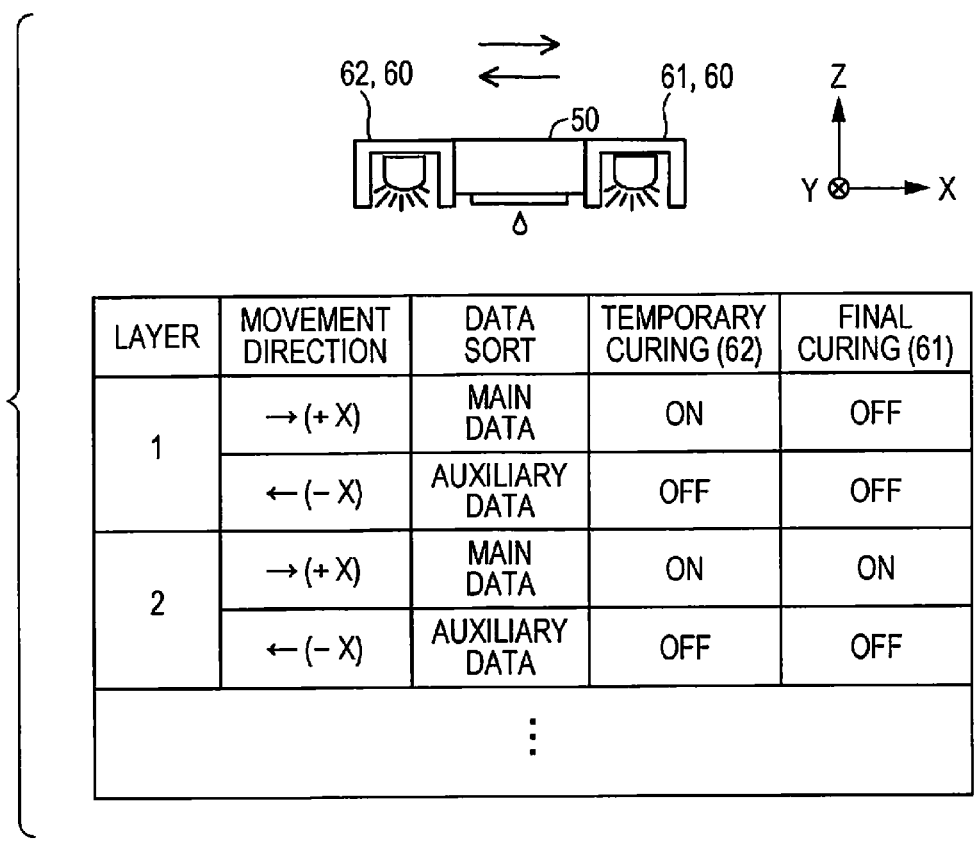
FIG. 8 is an explanatory diagram showing a specific controlling method of curing energy application units.

FIG. 8 is an explanatory diagram showing a specific controlling method of the curing energy application units 60 in the three-dimensional formation process described above. Hereinafter, the formation of the dots on the formation stage 11 while moving the head unit 50 from an end to the other end in the X direction is referred to as "scanning". A table shown in FIG. 8 shows that the cross section object formation process is performed by the main data when the head unit 50 performs the scanning in the positive X direction and then the filing process is performed by the auxiliary data when the head unit 50 performs the scanning in the negative X direction. For convenience of description, in FIG. 8, the movement of the head unit 50 in the Y direction is omitted.

When forming the cross section object for the first layer, the final curing light emitting apparatus 61 is turned off and the temporary curing light emitting apparatus 62 are turned on in the scanning in which the cross section object formation process is performed based on the main data. Accordingly, after the curable liquid is discharged from the head unit 50 and landed on the powder layer, the head unit 50 moves in the positive X direction and the temporary curing is performed at the timing when the temporary curing light emitting apparatus 62 arrives the upper portion of the curable liquid. The temporary curing can also be performed after the curable liquid is discharged from the head unit 50 and before the curable liquid is landed on the powder layer.

When the cross section object formation process based on the main data is completed, a scanning direction of the head unit 50 changes to the negative X direction and the filling process based on the auxiliary data is performed. When the filling process is performed, the temporary curing light emitting apparatus 62 is turned off and the final curing light emitting apparatus 61 is also turned off. Accordingly, as described above, after the auxiliary data is generated, the temporary curing is not performed.

Next, when forming the cross section object for the second layer, both of the final curing light emitting apparatus 61 and the temporary curing light emitting apparatus 62 are turned on in the scanning in which the cross section object formation process is performed based on the main data. Accordingly, first, the final curing is performed for the cross section object for the first layer formed by the previous cross section object formation process and the filling process by the final curing light emitting apparatus 61, while the head unit 50 performs the scanning in the positive X direction, and then the curable liquid for forming the cross section object for the second layer is immediately discharged onto the cross section object for the first layer subjected to the final curing, based on the main data. By doing so, the head unit 50 moves in the positive X direction and the curable liquid is temporarily cured at the timing when the temporary curing light emitting apparatus 62 arrives to the upper portion of the curable liquid. That is, for the second layer, the final curing of the cross section object for the first layer, the formation of the cross section object for the second layer, and the temporary curing of the cross section object for the second layer are performed in parallel in the first scanning. Then, the same control operation as that for the second layer is performed for the curing energy application units 60, and the cross section objects are successively subjected to the temporary curing and the final curing, and laminated with each other.

According to the control method of the curing energy application units 60 shown in FIG. 8, since both the temporary curing and the final curing are not performed immediately after the filling process based on the auxiliary data is performed, it is possible to reliably set the second time period t2 which is after the curable liquid is discharged in the filling process based on the auxiliary data and until the final curing is performed, to be longer than the first time period t1 which is after the curable liquid is discharged in the cross section object formation process based on the main data and until the temporary curing is performed.

According to the three-dimensional formation apparatus 100 described above, the hollow is formed in the portion where the outline of the cross section object is simultaneously changed in the X direction and the Y direction, and then the hollow is filled with the curable liquid to fill the hollow, and accordingly it is possible to effectively prevent generation of jaggy on the outline inclined in the X direction or the Y direction.

In the embodiment, since the temporary curing is performed after the cross section object having the hollow is formed, it is possible to prevent distortion of the shape of the hollow. Accordingly, in the subsequent filling process, it is possible to accurately discharge the curable liquid to the hollow. In addition, after filling the hollow with the curable liquid, the temporary curing is not performed, and thus, it is possible to sufficiently apply time only for filling the hollow with the curable liquid. Therefore, it is possible to more effectively prevent the generation of jaggy on the outline.

In the embodiment, the hollow is formed on the portion where the gradation value is less than 100% when the smoothing process of the raster data representing the cross section object is performed, and accordingly, it is possible to form the hollow in a position effective for preventing the generation of jaggy.

In the embodiment, the quantity of the curable liquid to be discharged to the hollow is calculated based on the gradation value of the element present in the hollow, before forming the hollow with respect to the raster data, and accordingly, it is possible to accurately acquire the quantity of the curable liquid for filling the hollow.

In the embodiment, since the first element in which the gradation value is less than 100% in the smoothing process is determined based on whether or not the polygon representing the three-dimensional object crosses the element, it is possible to accurately specify the first element.

In the embodiment, since the gradation value of the element in which the gradation value is less than 100% in the smoothing process is calculated according to a volume fraction of the polygon of the element, it is possible to accurately calculate the gradation value.

In the embodiment, since the direction in which the hollow is formed on the outline of the cross section object is specified according to the size of the X component and the Y component of the normal line of the polygon, it is possible to accurately specify the formation direction of the hollow which can prevent the generation of jaggy.

B. Second Embodiment

The three-dimensional formation apparatus 100 of the first embodiment forms the three-dimensional object using the curable liquid and the powder. According to this, the three-dimensional formation apparatus 100 of a second embodiment forms the three-dimensional object using a support material, in addition to the curable liquid. The support material of the embodiment is liquid which is cured by curing energy equivalent to the curing energy for curing the curable liquid, and is a material which can be dissolved by putting into water or a predetermined solution after the curing and can be easily removed. When the support material is discharged to the outside of the outline of the three-dimensional object, it is possible to prevent the spread of the outline of the three-dimensional object formed with the curable liquid to the outside. In the three-dimensional formation apparatus 100 of the second embodiment, nozzles for discharging the curable liquid and the support material are respectively included in the head unit 50, and a tank accommodating the curable liquid and a tank accommodating the support material are connected to the head unit 50. In the embodiment, the head unit 50 discharges the support material in the same scanning as the scanning for discharging the curable liquid. The head unit 50 can also discharge the support material in the scanning which is different from the scanning for discharging the curable liquid.

Figure 9A:
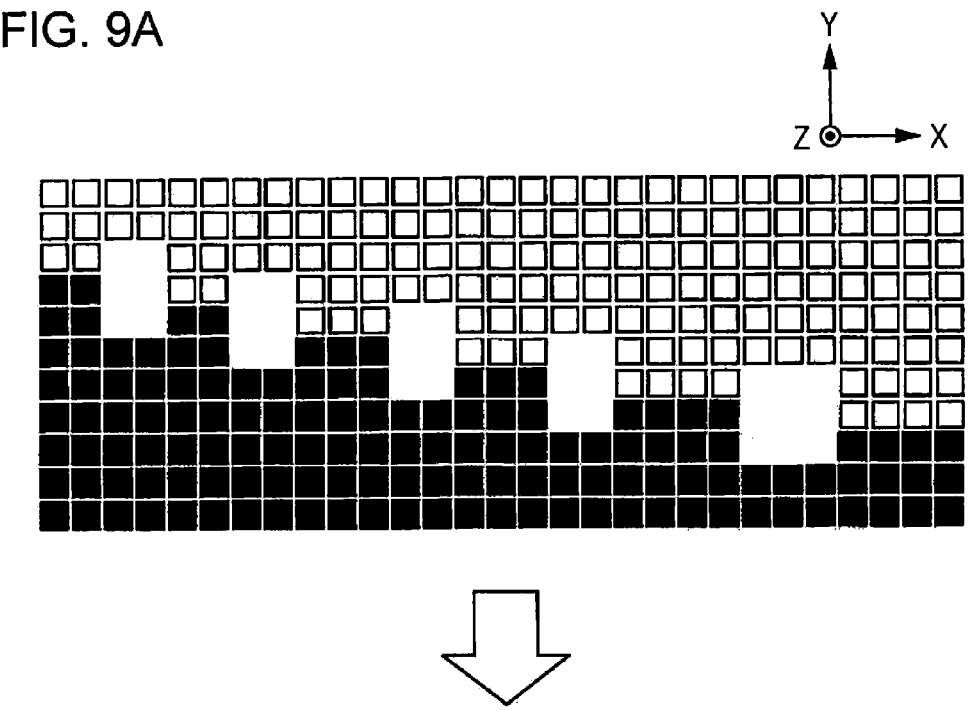
FIGS. 9A and 9B are explanatory diagrams showing a state where an outline portion of the cross section object is formed by curable liquid and a support material.
Figure 9B:
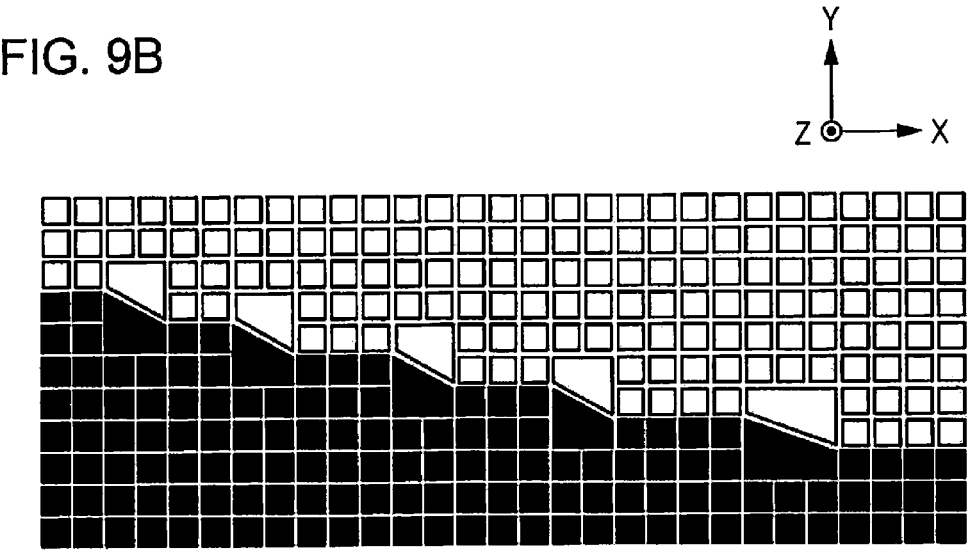

FIGS. 9A and 9B are explanatory diagrams showing a state where the outline portion of the cross section object is formed by curable liquid and a support material. In FIGS. 9A and 9B, the portion formed with the curable liquid is represented as a black lattice and the portion formed with the support material is represented as a white lattice. In the embodiment, the computer 200 also generates the main data and the auxiliary data for the portion to which the support material is discharged (hereinafter, referred to as a support area) based on the raster data after the smoothing process, in the same manner as that of the portion to which the curable liquid is discharged (hereinafter, referred to as a normal area). The gradation value of each element of the raster data used for discharging the support material is a value obtained by subtracting a value of the gradation value of each element of the raster data used for discharging the curable liquid from 100%. As shown in FIG. 9A, in the three-dimensional formation apparatus 100, when the cross section object formation process is executed based on the main data, the hollow is formed on both of the normal area and the support area. When the filling process is executed based on the auxiliary data after executing the cross section object formation process, the curable liquid is discharged to the hollow of the normal area and the support material is discharged to the hollow of the support area. By doing so, as shown in FIG. 9B, the dot formed with the curable liquid and the dot formed with the support area are adjacent to each other in the hollow portion. As described above, when the dot formed with the curable liquid and the dot formed with the support area are adjacent to each other in the hollow portion, it is possible to prevent the curable liquid from flowing to the outside of the outline, due to the presence of the support material. Therefore, according to the second embodiment, it is possible to more effectively prevent the generation of jaggy on the outline of the three-dimensional object.

C. Third Embodiment

FIG. 10 is a flowchart showing a smoothing process of a third embodiment. In the first embodiment, the three-dimensional data representing the shape of the three-dimensional object is represented as the three-dimensional polygon data. Meanwhile, in the third embodiment, the three-dimensional data is represented as the raster data for each cross section. The configurations of the three-dimensional formation apparatus 100 and the computer 200 of the third embodiment are the same as those in the first embodiment.

In the smoothing process of the embodiment, first, the computer 200 reads the three-dimensional data (Step S230). As described above, in the embodiment, the three-dimensional data is configured with the raster data for each cross section.

Then, the computer 200 compares a resolution in the XY direction of the read three-dimensional data (XY input resolution) and formation resolution in the XY direction of the three-dimensional formation apparatus 100 (XY formation resolution) to each other and determines whether or not the XY input resolution is higher than the XY formation resolution (Step S232). When it is determined that the XY input resolution is higher than the XY formation resolution (Step S232: YES), the computer 200 performs the general smoothing process for the raster data of all of the cross section and matches the resolution of the raster data of each cross section with the XY formation resolution (Step S234). Meanwhile, when it is determined that the XY input resolution is lower than the XY formation resolution (Step S232: NO), the computer 200 performs an interpolation process of a general image processing technology and the smoothing process for the raster data of all of the cross section and matches the resolution of the raster data of each cross section with the XY formation resolution (Step S236).

Then, the computer 200 determines whether or not a pitch of the three-dimensional data in the height direction (hereinafter, referred to as lamination pitch) matches with a formation resolution of the three-dimensional formation apparatus 100 in the Z direction (hereinafter, referred to as Z resolution) (Step S238). When it is determined that the lamination pitch matches with the Z resolution (Step S238: YES), the computer 200 accommodates the data subjected to the smoothing process so far in a memory or a recording medium (Step S240), and the process ends.

In Step S238 described above, when it is determined that the lamination pitch does not match with the Z resolution (Step S238: NO), the computer 200 determines whether or not the lamination pitch is greater than the Z resolution (Step S242). When it is determined that the lamination pitch is greater than the Z resolution (Step S242: YES), the computer 200 performs the interpolation between the cross sections according to the difference of the pitch, and matches the lamination pitch and the Z resolution with each other by increasing the number of cross sections (Step S244). Meanwhile, when it is determined that the lamination pitch is smaller than the Z resolution (Step S242: NO), the computer 200 performs thinning of the cross section data, reduces the number of the cross sections, and matches the lamination pitch and the Z resolution (Step S246). When the process in Step S244 or Step S246 is completed, the computer 200 accommodates the data subjected to the interpolation or the thinning in a memory or a recording medium (Step S240), and the process ends.

According to the smoothing process of the third embodiment described above, it is possible to appropriately perform the smoothing process, even when the three-dimensional data is represented as the raster data for each cross section.

In the third embodiment, there is no polygon used for specifying the second element at the time of generation of the main data. Accordingly, in the third embodiment, the second element is specified as follows. First, the computer 200 acquires a tangent line which circumscribes the first element in which the gradation value is less than 100%. The X component and the Y component of the normal line of the tangent line are calculated, and an element adjacent to a direction facing the larger component among the components is specified as the second element, in the same manner as in the method shown in FIG. 6. By doing so, it is possible to appropriately specify the second element, also in the third embodiment.

D. Fourth Embodiment

Figure 11:
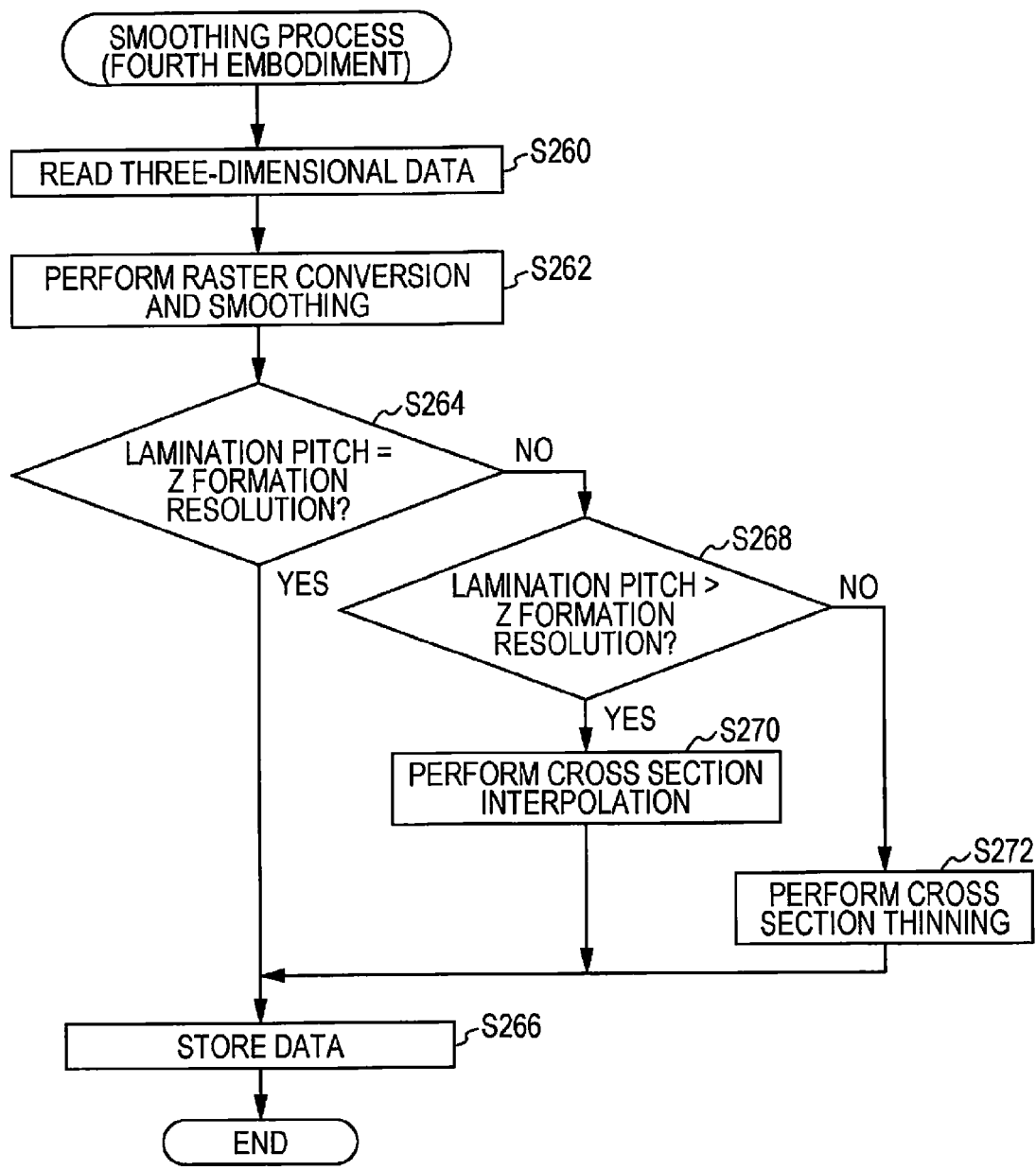
FIG. 11 is a flowchart showing a smoothing process of a fourth embodiment.

FIG. 11 is a flowchart showing a smoothing process of a fourth embodiment. In the third embodiment, the three-dimensional data is represented as the raster data for each cross section. Meanwhile, in the fourth embodiment, the three-dimensional data is represented as vector data for each cross section. The configurations of the three-dimensional formation apparatus 100 and the computer 200 of the fourth embodiment are the same as those in the first embodiment.

In the smoothing process of the embodiment, first, the computer 200 reads the three-dimensional data (Step S260). As described above, in the embodiment, the three-dimensional data is represented as the vector data for each cross section.

Next, the computer 200 performs raster conversion of a general image processing technology and the smoothing process for all of the cross sections of the read three-dimensional data (Step S262). The raster conversion is a process of performing conversion from the vector data into the raster data.

When the raster conversion and the smoothing process are performed, the computer 200 performs the interpolation of the cross section and the thinning of the cross section by executing the same processes as those in Steps S238 and S242 to S246 of the third embodiment (Steps S264 and S268 to S272). The computer 200 accommodates the three-dimensional data subjected to each process described above in a memory or a recording medium (Step S266), and the process ends.

According to the fourth embodiment described above, it is possible to appropriately perform the smoothing process, even when the three-dimensional data is represented as the vector data for each cross section.

Even in the fourth embodiment, there is no polygon used for specifying the second element at the time of generation of the main data, in the same manner as in the third embodiment. Accordingly, in the fourth embodiment, the second element is specified as follows. First, the computer 200 acquires a vector which crosses the first element in which the gradation value is less than 100%. The X component and the Y component of the normal line of the vector are calculated, and an element adjacent to a direction facing the larger component among the components is specified as the second element, in the same manner as in the method shown in FIG. 6. By doing so, it is possible to appropriately specify the second element, also in the fourth embodiment.

E. Fifth Embodiment

Figure 12:
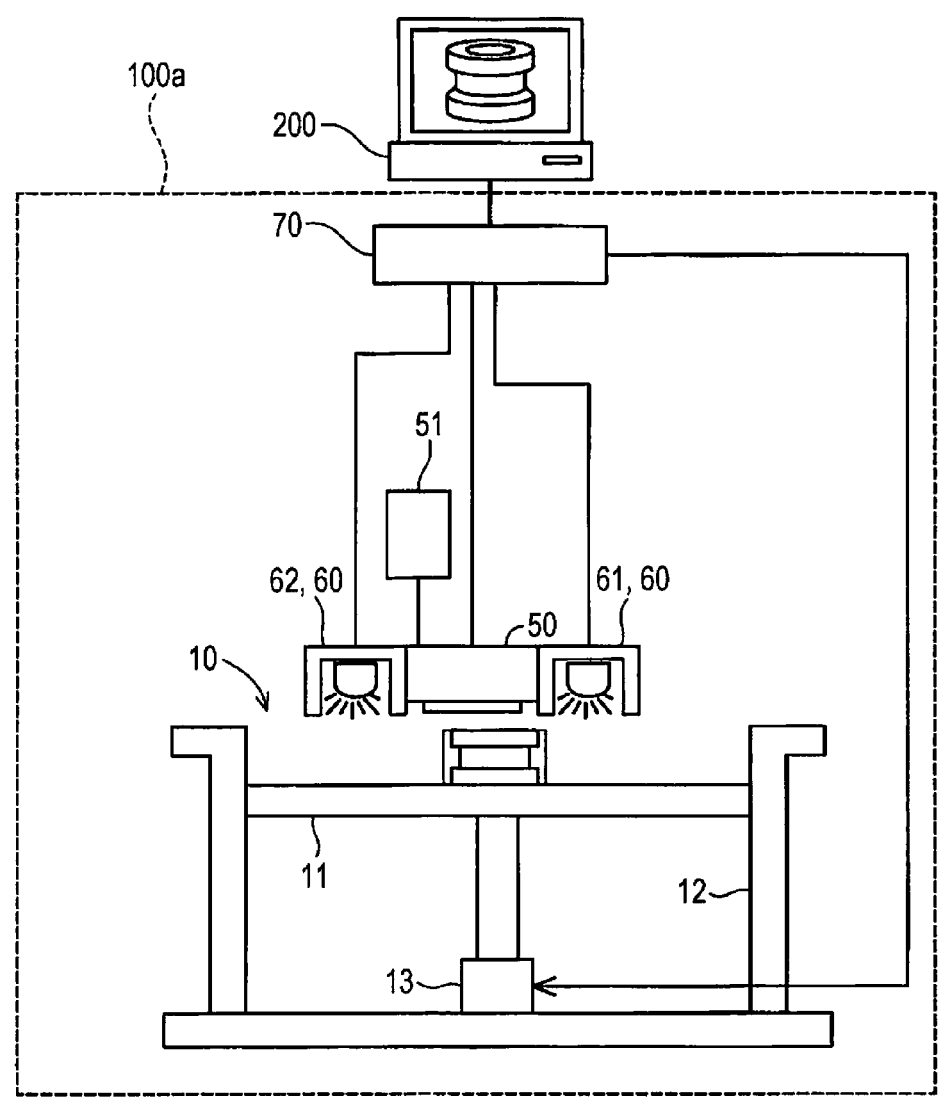
FIG. 12 is an explanatory diagram showing a schematic configuration of a three-dimensional formation apparatus of a fifth embodiment.

FIG. 12 is an explanatory diagram showing a schematic configuration of a three-dimensional formation apparatus of a fifth embodiment. The three-dimensional formation apparatus 100 of the first embodiment forms a three-dimensional object by discharging the curable liquid to the powder supplied into the formation unit 10. Meanwhile, a three-dimensional formation apparatus 100a of the fifth embodiment forms a three-dimensional object only with curable liquid containing a resin, without using the powder.

The three-dimensional formation apparatus 100a includes the formation unit 10, the head unit 50, the curing energy application units 60, and the control unit 70. In the same manner as in the first embodiment, the formation unit 10 includes the formation stage 11, the frame body 12, and the actuator 13. However, the frame body 12 may be omitted. A tank 51 is connected to the head unit 50. The curing energy application units 60 includes the final curing light emitting apparatus 61 and the temporary curing light emitting apparatus 62. That is, most configurations of the three-dimensional formation apparatus 100a are common with the configurations of the three-dimensional formation apparatus 100 of the first embodiment, and has a configuration omitting the powder supply unit 20, the flattening mechanism 30, and the powder collection unit 40 from the three-dimensional formation apparatus 100 of the first embodiment. Even in the three-dimensional formation apparatus 100a, it is possible to form a three-dimensional object by performing the same process as that of the three-dimensional formation apparatus 100 of the first embodiment, except for the process of forming the powder layer. Even in the fifth embodiment, it is possible to form a three-dimensional object using the support material, in the same manner as in the second embodiment. When the support material is used in the fifth embodiment and an area of a cross section on an upper layer is larger than an area of a cross section on a lower layer, it is possible to support the portion having the larger area with the support material on the lower layer.

F. Modification Examples

First Modification Example

In the embodiments, the timing for performing the temporary curing and the final curing by the curing energy application units 60 is not limited to the timing shown in FIG. 8, and can be appropriately set according to chemical properties of the curable liquid (or the support material, same applied to the followings) or scattering speed of the curable liquid. For example, the temporary curing may be executed from the execution of the cross section object formation process and until the filling process is started. In addition, the final curing may be executed at any timing from the execution of the filling process and until the next cross section object formation process is executed. The final curing may be performed after sufficient time has elapsed until the difference-in-level portion is filled with the curable liquid discharged to the thinner portion by the filling process.

Second Modification Example

In the embodiments, the temporary curing and the final curing are performed after discharging the curable liquid, but any one of the temporary curing and the final curing can be omitted. Both of the temporary curing and the final curing may be omitted depending on the material of the curable liquid or the powder. As an example in which both curing processes are not performed, an adhesive (binder) may be used as the curable liquid and gypsum powder may be used as the powder. The kind of the curing energy is also not limited to the ultraviolet light and can be appropriately changed depending on the properties of the curable liquid or the powder.

Third Modification Example

In the embodiments, the head unit 50 moves relatively in the Z direction by moving the formation stage 11 in the Z direction. Meanwhile, the position of the formation stage 11 may be fixed and the head unit 50 may be directly moved in the Z direction. In addition, in the embodiments, the head unit 50 moves in the X direction and the Y direction, but the position of the head unit 50 moves in the X direction and the Y direction may be fixed and the formation stage 11 may move in the X direction and the Y direction.

Fourth Modification Example

In the embodiments, among the three-dimensional formation processes shown in FIG. 2, the acquisition of the three-dimensional data in Step S100, the smoothing process in Step S200, and the generation of the main data and the auxiliary data in Step S300 are executed by the computer 200. Meanwhile, the steps may be executed by the three-dimensional formation apparatus 100. That is, the three-dimensional formation apparatus 100 may singly execute all processes from the acquisition of the three-dimensional data to the formation of the three-dimensional object. In the embodiments, Steps S400 to S900 of the three-dimensional formation process shown in FIG. 2 are executed by the control unit 70 of the three-dimensional formation apparatus 100. Meanwhile, the steps may be executed by controlling each unit of the three-dimensional formation apparatus 100 by the computer 200. That is, the computer 200 may realize the function of the control unit 70 of the three-dimensional formation apparatus 100.

Fifth Modification Example

In the embodiments, the head unit 50 discharges the curable liquid in the vertical direction, but may discharge the curable liquid in the horizontal direction or the other directions and form the three-dimensional object.

Sixth Modification Example

In the embodiments, when the curable liquid containing the quantity corresponding to the gradation value is discharged to the head unit 50, the control unit 70 selects the quantity closest to the designated gradation value among the predetermined kinds of quantity. Meanwhile, the control unit 70 can form the dots with the more kinds of the quantity of the curable liquid, by discharging the curable liquid containing the single quantity or the curable liquid containing fewer kinds of quantity to the same position several times.

The invention is not limited to the embodiments or the modification examples described above and can be realized with various configurations within a range not departing from a gist thereof. For example, the embodiments corresponding to the technical features in each aspect disclosed in the summary or the technical features in the modification examples can be appropriately replaced or combined with each other, in order to solve a part or all of the problems described above or to achieve a part or all of the effects described above. If the technical features are not described as compulsory in this specification, those can be appropriately deleted.

The entire disclosure of Japanese Patent Application No. 2014-065415, filed Mar. 27, 2014 and No. 2014-249659, filed Dec. 10, 2014 are expressly by reference herein.

What is claimed is:

1. A three-dimensional formation apparatus which forms a three-dimensional object, the apparatus comprising:
    a head unit which discharges liquid which is one material of the object in a first direction, among the first direction, a second direction, and a third direction orthogonal to each other; and
    a control unit which forms the object by laminating a plurality of cross section objects by executing a cross section object formation process of forming a cross section object for one layer of the object several times by discharging a quantity of the liquid equal to or smaller than a first quantity to a designated coordinate among coordinates representing a position in the second direction and a position in the third direction, by controlling the head unit,
    wherein the control unit
        forms a hollow on a changed portion where an outline of the cross section object is simultaneously changed in the second direction and the third direction towards the inside from the outline of the cross section object in the second direction or the third direction, in the first cross section object formation process among the cross section object formation processes executed several times, and
        executes a filling process of discharging a second quantity of the liquid which is larger than the first quantity to the hollow so as to come in contact with the cross section object formed in the first cross section object formation process, to fill at least a part of the hollow with the liquid, after the first cross section object formation process is executed and before the second cross section object formation process is executed.

2. The three-dimensional formation apparatus according to claim 1, further comprising:
    a curing energy application unit which applies curing energy for curing the liquid, wherein the curing energy application unit
  applies the curing energy to the discharged liquid, after the liquid is discharged in the first cross section object formation process and before the filling process is executed at an interval of a first time period, and
  applies the curing energy to the discharged liquid, after the liquid is discharged in the filling process and before the second cross section object formation process is executed at an interval of a second time period which is longer than the first time period.

3. The three-dimensional formation apparatus according to claim 1,
  wherein the coordinate to which the liquid is discharged in the cross section object formation process has each element corresponding to each coordinate and is designated by two-dimensional raster data in which a gradation value corresponds to the each element, and
  the changed portion is a portion including a first element in which the gradation value is less than 100% and a second element which comes in contact with the inside of the first element on the second direction side or the third direction side, when a portion corresponding to the outline of the cross section object of the raster data is subjected to a smoothing process.

4. The three-dimensional formation apparatus according to claim 3,
  wherein the second quantity is a quantity corresponding to a value obtained by adding the gradation value of the first element and the gradation value of the second element.

5. The three-dimensional formation apparatus according to claim 3,
  wherein the shape of the object is represented with polygon data which is an assembly of a plurality of polygons, and
  the first element is an element corresponding to a position where the polygon crosses.

6. The three-dimensional formation apparatus according to claim 5,
  wherein the gradation value of the first element is a value corresponding to a ratio of a volume remaining when a volume is cut by the polygon, to the volume of the first element occupying a three-dimensional space.

7. The three-dimensional formation apparatus according to claim 5,
  wherein the second element is an element adjacent to a direction of a large component among a component in the second direction and a component in the third direction of an inward normal line of the polygon which crosses the first element, among an element in the second direction adjacent to the first element and an element in the third direction adjacent to the first element.

* * * * *